No. 882,211. PATENTED MAR. 17, 1908.
J. SCHUSTER.
MILK PAIL SUPPORT.
APPLICATION FILED OCT. 8, 1907.
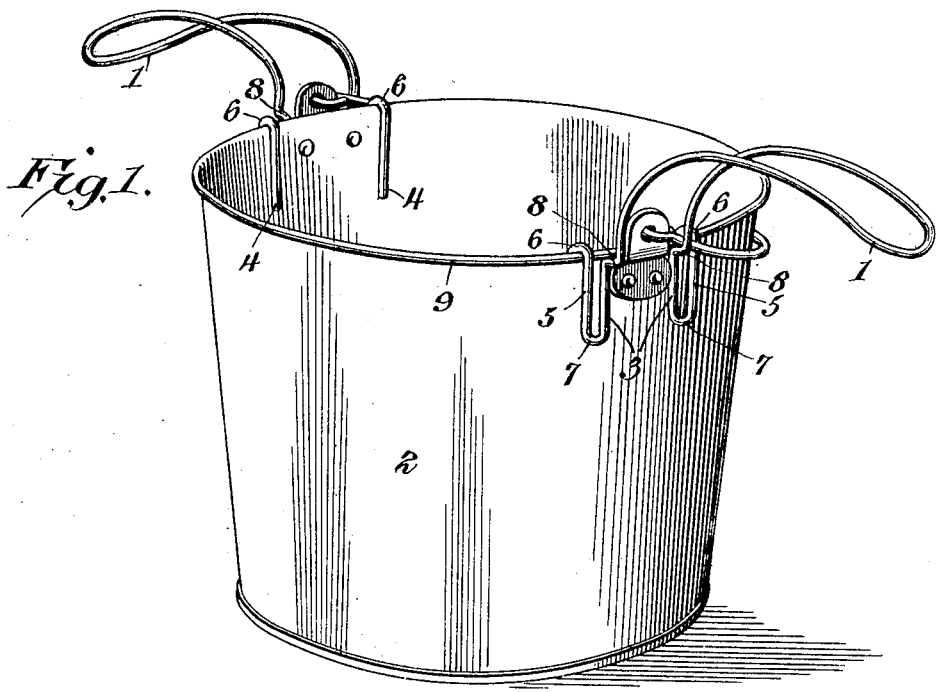
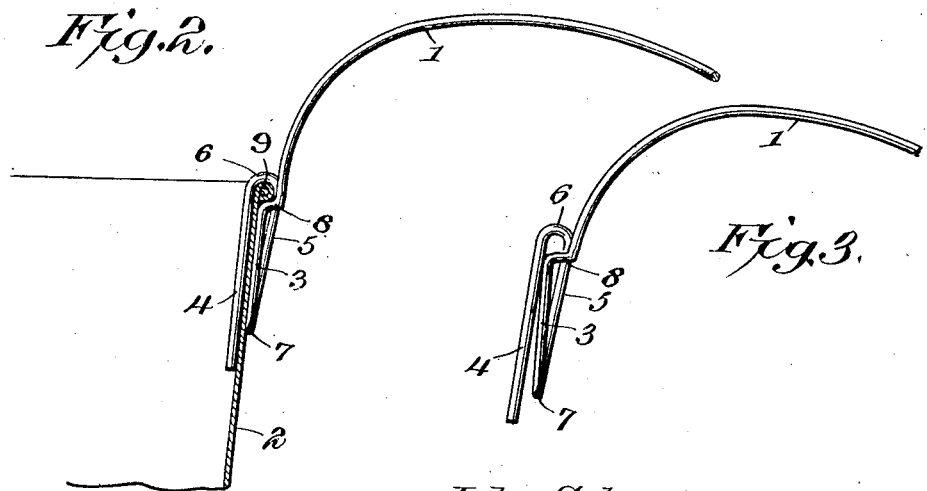
John Schuster, Inventor,

UNITED STATES PATENT OFFICE.

JOHN SCHUSTER, OF CLAY BANKS, WISCONSIN.

MILK-PAIL SUPPORT.

No. 882,211.   Specification of Letters Patent.   Patented March 17, 1908.

Application filed October 8, 1907. Serial No. 396,372.

*To all whom it may concern:*

Be it known that I, JOHN SCHUSTER, a citizen of the United States, residing at Clay Banks, in the county of Door and State of Wisconsin, have invented a new and useful Milk-Pail Support, of which the following is a specification.

The invention relates to improvements in milk pail supports.

The object of the present invention is to improve the construction of that class of milk pail supports, adapted to rest upon the legs of the milker for suspending a milk pail between the same, and to provide a simple, strong and durable device of this character adapted to be easily and quickly applied to and removed from a milk pail, and capable of securely gripping the same and of enabling the legs of the milker to be arranged in a variety of positions to support the milk pail at the desired elevation.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of a milk pail provided with a pair of supports, constructed in accordance with this invention. Fig. 2 is a vertical sectional view of one side of the same. Fig. 3 is a side elevation of a portion of one of the supports, illustrating the arrangement of the inner and outer jaws when the clamp is not in engagement with a pail.

Like numerals of reference designate corresponding parts in all the figures of the drawing.

1—1 designate milk pail supports, designed to be applied to a milk pail 2 at opposite sides of the upper edge or rim thereof, as clearly illustrated in Fig. 1 of the drawing, and adapted to rest upon and suspend the milk bucket between the legs of the milker to relieve the latter of the strain and labor incident to supporting the milk pail in position by gripping the same with the legs. Each milk pail support consists of a single piece of stout wire, centrally bent to form an approximately U-shaped body, which is curved longitudinally to conform generally to the configuration of the upper portion of the leg, so that the support when in use will fit the leg in a comfortable and easy manner.

The support is provided at the inner end of each side of the body portion with a clamp, composed of an outer jaw 3, an inner jaw 4 and a connecting portion 5, arranged in substantial parallelism with the inner jaw and extending from the top of the same to the lower end of the outer jaw and connected with the said jaws by bends 6 and 7. The outer jaw 3 is arranged at an angle to the inner jaw when the clamp is not in engagement with the pail, as illustrated in Fig. 3 of the drawing. The inner and outer jaws diverge downwardly, when in such position, and the outer jaw is provided at the top with a shoulder 8, formed by bending the wire outward horizontally. The outwardly extending horizontal portion or shoulder 8 connects the jaw with the body portion of the support, and it is adapted to engage beneath the bead 9 of the upper edge or rim of the pail, whereby the clamp is securely interlocked with the pail and is effectually prevented from accidentally releasing the same. When the clamp is in engagement with the pail, the bead thereof fits within the upper bend 6 of the inner jaw, and is clamped between the same and the outer jaw, which is forced away from the inner jaw by the pail, the two jaws being in substantial parallelism when in engagement with the said pail, as illustrated in Fig. 2 of the drawing. The curved body portions extend upwardly and outwardly from the opposite sides of the pail at the top thereof and rest upon the legs of the milker, and owing to the firm gripping action of the clamps, the pail is securely held and it is unnecessary to grip the same with the legs, which may be placed in a variety of positions to arrange the pail at the desired elevation. Also as the support consists of a single piece of wire, it may be cheaply constructed, and is adapted to be quickly and easily applied to and removed from a pail.

Having thus fully described my invention, what I claim as new and desire to secure by Letters Patent, is:—

1. A milk pail support consisting of a single piece of wire and composed of an outwardly extending body portion arranged to rest upon the leg of the milker, and a pair of pail-engaging clamps located at the inner end of the body portion and composed of an outer jaw provided at the top with a shoulder to engage under the bead of a milk pail, and an inner jaw coöperating with the outer jaw and connected with the same.

2. A milk pail support consisting of a single piece of wire and comprising an outwardly extending body portion, and a clamp arranged at the inner end of the body portion and composed of an outer jaw provided at the top with a substantially horizontal portion forming a shoulder to engage under the bead of a milk pail and connecting the outer jaw with the said body portion, an inner jaw coöperating with the outer jaw and provided at the top with a bend to engage over the said bead, and a connecting portion extending from the bend of the inner jaw to the lower end of the outer jaw.

In testimony, that I claim the foregoing as my own, I have hereto affixed my signature in the presence of two witnesses.

JOHN SCHUSTER.

Witnesses:
   M. T. Parker,
   M. C. Parker.